Sept. 18, 1962 G. A. LARRY 3,054,308
DRILL
Filed Nov. 15, 1960
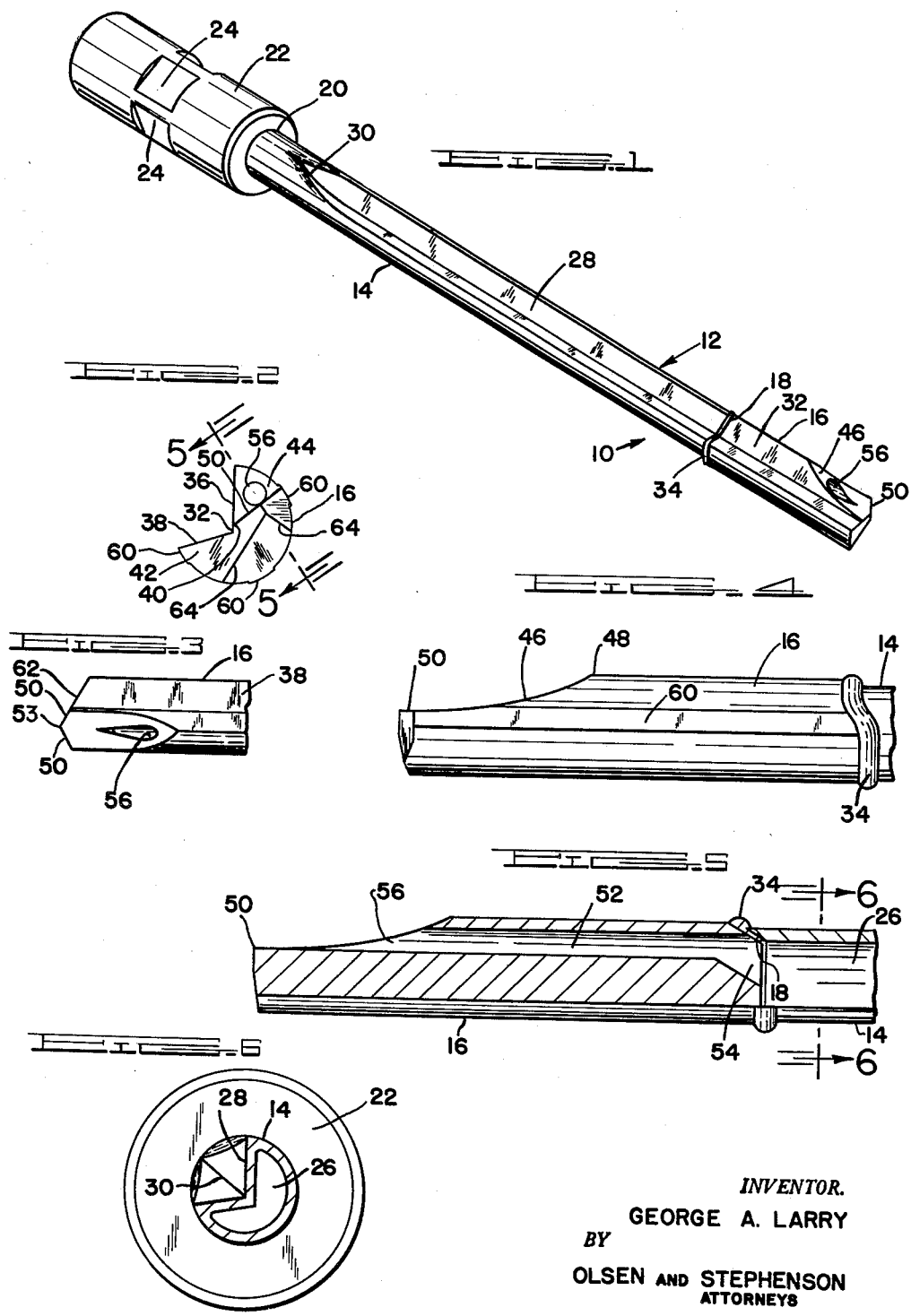
INVENTOR.
GEORGE A. LARRY
BY
OLSEN AND STEPHENSON
ATTORNEYS Patented Sept. 18, 1962

3,054,308
DRILL
George A. Larry, Farmington, Mich., assignor to Star Cutter Company, Farmington, Mich., a corporation of Michigan
Filed Nov. 15, 1950, Ser. No. 69,370
4 Claims. (Cl. 77—68)

This invention relates generally to drills and more particularly to an improved gun drill.

Drills of the type to which this invention relates consist of an elongated hollow shank provided at one end with a tip which is of an enlarged diameter relative to the shank. The tip, which is usually formed of a hard material such as carbide for wear purposes and is brazed or otherwise secured to the shank, has a cutting edge at its terminal end which engages the work and on rotation of the drill, or on rotation of the workpiece, cuts into the work. As the cutting edge cuts into the work it lifts or removes small pieces of the work which break off and form what are commonly called "chips" so that during drilling chips are continually being formed from the work. In center cut gun drills, which are capable of forming a blind or a through hole in a work piece, the chips must be removed from the opening being formed by travel in a direction opposite to the direction of drilling for flow out the end of the opening at which drilling was commenced. For this purpose many conventional drills are formed on their outer surfaces with chip carrying grooves which extend to the cutting end of the tip. Fluid under pressure is supplied to the hollow shank and flows through a passage in the tip for flushing chips out of the drilled hole through the chip passage. This fluid is also intended to cool the cutting end of the tip.

The size and configuration of the chips varies depending on the nature of the metal from which the work is formed and the configuration of the cutting end of the tip, but in all cases the speed of the drilling operation depends upon a quick removal of the chips from the opening being drilled. In order to accomplish this, it is desirable to provide for a breaking off of each chip as soon as it is formed to keep the chip as small as possible, cool the chips as rapidly and as much as possible, and provide a large chip carrying passage so that any large chips will be removed. It is also desirable to provide for a sufficient application of the cooling fluid to all parts of the cutting tip so that it will be kept cool to prolong the life of the tip.

It is an object of this invention, therefore, to provide a drill of the above described type which provides for an effective application of a cooling fluid to the cutting edge and a quick removal of the chips from the tip area of the tool.

A further object of this invention is to provide a drill of the above described type which can be economically manufactured and used over a prolonged service life.

Further objects, features and advantages will become apparent from a consideration of the following description, the appended claims and the accompanying drawing in which:

FIGURE 1 is a perspective view of the drill of this invention;

FIGURE 2 is an end view of the tip end of the tool of this invention;

FIGURE 3 is a fragmentary plan view of the tip portion of the drill of this invention;

FIGURE 4 is a fragmentary elevational view of the tip portion of the drill of this invention;

FIGURE 5 is a sectional view of a portion of the drill of this invention looking substantially along the line 5—5 in FIGURE 2; and FIGURE 6 is a transverse sectional view of the drill of this invention as seen from the line 6—6 in FIGURE 5.

With reference to the drawing, the drill of this invention, indicated generally at 10, is illustrated in FIGURE 1 as consisting of an elongated generally cylindrical body 12 having a shank portion 14 and a tip portion 16 secured to one end 18 of the shank portion 14. At its opposite end 20, the shank portion 14 is illustrated as being secured to an enlarged mounting member 22 having flat surface portions 24 formed in its periphery for adapting the member 22 for attachment to a machine (not shown) capable of rotating the drill 10 or holding the drill 10 for engagement with a rotating work piece. The member 22 forms no part of the present invention and may be of any desired shape for adapting the drill 10 for attachment to the particular machine or tool in which it is to be mounted.

The shank portion 14 of the drill 10 is of a tubular shape having an elongated opening or passage 26 therein which extends the full length of the shank portion 14 and communicates with a fluid supply passage (not shown) in the head 22. The shank portion 14 may be readily formed from a tubular body which is creased or deformed to form the body with a longitudinally extending V-shape passage or groove 28 in its external surface. The groove 28 extends from the end 18 of the shank portion 14 substantially the full length of the shank portion 14 and terminates at an inclined crease 30 formed adjacent the opposite end 20 of the shank portion 14.

The tip portion 16, which is preferably formed of a hard wear-resistant material, such as a hard steel or a suitable metallic carbide which is preferred at the present time, is also of a generally cylindrical shape and is of a larger diameter than the shank portion 14 so that the shank portion 14 will be in a clearance relation with the side walls of an opening formed with the drill 10. A groove or passage 32, of generally V-shape and corresponding substantially to the shape of the groove 28 in the shank portion 14, extends the full length of the tip portion 16 which is secured to the end 18 of the shank portion 14 so that the grooves 28 and 32 are in longitudinal alignment. The tip portion 16 may be secured in any suitable manner to the end 18 of the shaft portion 14 and is illustrated as extending partially into the end 18 and being secured thereto by brazing 34. The passages 28 and 32 are illustrated as being straight, and this construction is preferred, but it is to be understood that if desired, they could extend helically about the outer surface of the drill 10.

As shown in FIGURE 2, the passage 32 has a pair of angularly related side walls 36 and 38 and the passage 32 is of a depth such that side wall 36 extends past the axis 40 of the tip portion 16 which is also the axis of the drill 10. The side wall 36 is also located so that intermediate its ends it is adjacent the axis 40, as shown in FIGURE 2.

This configuration of the tip portion 16 provides for the formation of angular sections 42 and 44 located in one half of the tip portion 16 on opposite sides of the passage 32. The section 44 is cut back at the terminal end of the tip portion 16, as shown in FIGURES 2, 3, 4 and 5, so as to form a surface 46 which extends from the terminal end of the tip portion 16 to a point 48 intermediate the ends of the tip portion 16. Adjacent the point 48, the surface 46 is illustrated as being curved (FIGURES 4 and 5) and adjacent the terminal end of the tip portion 16 the surface 46 is shown substantially flat, but it is to be understood that this shape of the surface 46 is not critical and can be varied. The line of intersection of the surface 46 with the end surface of the tip portion 16 constitutes a cutting edge 50 for the tip portion 16. The surface 46 is aligned with the edge 50 in a direction longitudinally of the body 12, meaning that a plane parallel to axis 40 and to one side of groove 32 will intersect both edge 50 and surface 46.

As shown in FIGURE 3, the cutting edge 50 is substantially V-shape, having a point or apex 53 intermediate its ends, but it is to be understood that the cutting edge 50 may be of any shape desired for accomplishing a particular drilling operation. Since the drill 10 is a center cut type drill, namely, a drill capable of forming an opening in a solid workpiece, as contrasted with a pin cutting type drill which can be used only to drill openings completely through a work piece or a hole enlarging tool which can be used only to enlarge an opening, the cutting edge 50 extends to or slightly past the tip axis 40 as shown in FIGURE 2 so that in all cases the cutting edge 50 intersects the axis 40.

A longitudinally extending fluid passage 52 is formed in the tip portion 16 and is located so that at one end 54 it communicates with the passage 26 in the shank portion 14 and at the opposite end the passage 52 forms an orifice 56 located in the surface 46 so that fluid under pressure issuing from the orifice 56 will be directed across the cutting edge 50. The orifice 56 is spaced a sufficient distance from the cutting edge 50 so that the stream of fluid issuing from the orifice 56 will spread out sufficiently to be directed over the full length of the cutting edge 50.

The end of the passage 52 adjacent the orifice 56 controls the direction of fluid discharged from the orifice 56 and is illustrated as being substantially tangent to a plane which includes the axis 40 and the cutting edge 50, but it is to be understood that the orifice 56 may be located above or below this plane. However, the illustrated location is preferred because it insures a supply of cooling fluid under pressure to the cutting edge 50. It is also convenient to form the opening 52, when it is so located, by drilling so that no grooves are formed in the cutting edge 50.

The tip portion 16 is ground so that it is provided with wear lands or pads 60 which are spaced about the periphery of the tip portion 16 and extend longitudinally of the tip portion 16. The wear lands 60 are on a slightly larger diameter than the remainder of the tip portion 16 which is thus relieved between the wear lands 60 to reduce the friction between the side wall of the opening and the tip portion 16. The number and location of the wear lands 60 is a matter of choice depending on the particular use for which the drill 10 is intended, but it is desirable to locate at least two of the wear lands 60 on a diameter of the tip portion 16 to facilitate measuring of the diameter of the tip portion 16. It is also advisable to locate the wear lands 60 as close as possible to the edges of the groove 32 for strength purposes. The wear lands 60 bear against the side wall of the drilled opening and keep the drill 10 centered in the opening. The end of the tip portion 16 is conveniently ground off on straight lines extending in opposite directions from the point 53. The edge 62 formed at one side of the passage 32 and spaced from the cutting edge 50 does not perform any cutting function in the drilling operation. The end of the tip portion 16 can be ground back from the cutting edge 50 as shown and such a grinding results in the grind lines 64 shown in FIGURE 2.

In use, either the drill 10 is rotated or the work piece is rotated so that the drill 10 rotates about its axis 40 relative to the work piece in a clockwise direction when viewed from the end that carries the head 22 or in a counterclockwise direction as viewed in FIGURE 2, so that the cutting edge 50 engages the work piece and acts to remove metal therefrom. Concurrently with relative rotation of the drill 10 and the work piece, fluid under pressure is supplied to the passage 26 for flow through the passage 52 and discharge as a high velocity stream from the discharge orifice 56. This fluid stream diverges after discharge from orifice 56 and is directed across the full length of cutting edge 50 so that it acts to break off a chip as soon as it is formed by the cutting edge 50 thereby maintaining the chips of a minimum size. The broken off chips are flushed out of the drilled hole through the communicating passages 32 and 28 as soon as the chips are formed since the only place for the fluid issuing from orifice 56 to flow is out the chip carrying passages 32 and 28. By virtue of the location of the discharge orifice 56, the cutting edge 50 and the adjacent parts of the cutting tip 16 are also cooled by the fluid to prolong the life thereof. Since fluid is directed against a chip as soon as it is formed, it is chilled by the cooling fluid to prevent it from expanding under the influence of heat. This is important because an expanded chip is more difficult to remove from the drilled hole. However, by virtue of the fact that only the single chip carrying passage 32 is formed in the tip portion 16, it can be formed of a depth such that it will carry any large chips which might be formed and will carry a large number of smaller chips. As a result the drill 10 of this invention can be operated at high speed over a prolonged service life. The shape to which the terminal or working end of the tip 16 is ground depends upon the metal being drilled and the chip formation which will provide the most efficient drilling operation. The showing of the tip ground to provide the apex 53 is for illustrative purposes only, but in all cases the cutting edge 50 is located so that it intersects the axis 40 and is in the path of fluid from orifice 56.

It is apparent that the drill 10 of this invention can also be used for enlarging openings such as those that might be formed in a cast part. One situation in which the drill 10 is particularly advantageous involves the enlarging of openings of this type in which the bottom end of the opening to be enlarged may or may not be closed by flash. In other words, in some cases parts on the automated line which travels past a machine carrying the drill 10 may have the openings therein closed at their bottom ends by flash and in other cases the bottom ends of the openings may be open. Conventional center cut drills cannot be used because the fluid discharge orifice is to one side of the cutting edge and if the opening is not covered by flash, the fluid will merely flow out of the bottom end of the opening and will not function to cool the drill or flush out the chips. A reamer or other hole enlarging tool which utilizes cooling fluid cannot be used because such tools have no provision for a return flow of fluid. As a result, if the opening to be enlarged is closed by flash the fluid will only back up in the opening and the chips will not be removed. In the drill 10, the chip carrying passage 32 provides for the removal of the chips in all cases and the location of the fluid discharge orifice 56 so that fluid is directed across the cutting edge 50 provides for an effective use of the cooling fluid under all circumstances.

I claim:

1. A drill comprising a generally cylindrical body having a shank portion and a tip portion, said body having a longitudinally extending groove formed in the outer surface thereof extending the full length of said tip portion, the side walls of said groove in said tip portion being angularly related, the terminal end of said tip portion having a single cutting edge extending substantially radially thereof from one side surface thereof through the axis of said tip portion and terminating in a spaced relation with a diametrically opposite side surface thereof, said tip portion being formed intermediate the ends thereof with a wall portion located to one side of said groove and in alignment with said cutting edge in a direction longitudinally of said body, and means forming a fluid passage in said body terminating at said wall portion in an orifice positioned so that when fluid is supplied to said passage it is discharged from said orifice in a direction toward said cutting edge.

2. A drill comprising a generally cylindrical body having a shank portion and a tip portion, said body having a longitudinally extending groove formed in the outer surface thereof extending the full length of said tip portion and being of a depth in said tip portion substantially equal to the radius of said tip portion, the terminal end of said tip portion having a cutting edge extending substantially radially thereof and intersecting the axis of said tip portion, said tip portion being formed with a surface extending from a point intermediate the ends of said tip portion to said cutting edge and at said cutting edge being of a width coextensive with the length of said cutting edge, and means forming a fluid passage in said body terminating at said surface in an orifice positioned so that it is substantially tangent to a plane which includes said cutting edge and the longitudinal axis of said tip portion so that fluid issuing from said orifice is directed across said cutting edge.

3. A drill comprising an elongated rotatable body having a shank portion and a tip portion located at one end of said shank portion, said body having an axis of rotation and a groove extending longitudinally of the outer surface thereof and terminating at the terminal end of said tip portion, said tip portion having a cutting edge formed at the terminal end thereof extending transversely thereof from one side surface thereof to a position spaced from the diametrically opposite side surface thereof and intersecting said axis at one side of said groove, said tip portion having a passage adapted to be supplied with fluid under pressure said passage terminating in a fluid discharge orifice located on said one side of said groove and spaced from said cutting edge in a direction longitudinally of said body, said passage and said orifice being located with respect to said cutting edge so that fluid under pressure discharged from said orifice is directed toward said cutting edge.

4. A drill comprising an elongated rotatable body having a shank portion and a tip portion located at one end of said shank portion, said body having an axis of rotation and a substantially V-shape groove of a depth substantially equal to the radius of said body extending longitudinally of the outer surface thereof and terminating at the terminal end of said tip portion, said tip portion having a cutting edge formed at the terminal end thereof extending transversely thereof and intersecting said axis at one side of said groove, said tip portion having a passage formed therein communicating with said hollow shank portion and adapted to be supplied with fluid under pressure therefrom, said passage terminating in a fluid discharge orifice located on said one side of said groove and spaced from said cutting edge in a direction longitudinally of said body, said passage and said orifice being located with respect to said cutting edge so that fluid under pressure discharged from said orifice is directed toward said cutting edge.

References Cited in the file of this patent
UNITED STATES PATENTS

| | | |
|---|---|---|
| 2,237,901 | Chun | Apr. 8, 1941 |
| 2,610,529 | Atkinson | Sept. 16, 1952 |